(12) United States Patent
Taraiya et al.

(10) Patent No.: US 12,083,732 B2
(45) Date of Patent: Sep. 10, 2024

(54) BIAXIALLY ORIENTED PIPE

(71) Applicant: SABIC GLOBAL TECHNOLOGIES B.V., Bergen op Zoom (NL)

(72) Inventors: Ajay Kumar Taraiya, Maastricht (NL); Maria Soliman, Selfkant (DE); Peter Degenhart, Echt (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 344 days.

(21) Appl. No.: 17/764,788

(22) PCT Filed: Oct. 2, 2020

(86) PCT No.: PCT/EP2020/077666
§ 371 (c)(1),
(2) Date: Mar. 29, 2022

(87) PCT Pub. No.: WO2021/064178
PCT Pub. Date: Apr. 8, 2021

(65) Prior Publication Data
US 2022/0371262 A1 Nov. 24, 2022

(30) Foreign Application Priority Data
Oct. 4, 2019 (EP) .................................. 19201567

(51) Int. Cl.
*B29C 55/26* (2006.01)
*B29C 55/00* (2006.01)
*B29K 23/00* (2006.01)
*F16L 9/12* (2006.01)

(52) U.S. Cl.
CPC ............ *B29C 55/26* (2013.01); *B29C 55/005* (2013.01); *B29K 2023/08* (2013.01); *B29K 2023/12* (2013.01); *B29K 2023/16* (2013.01); *F16L 9/12* (2013.01)

(58) Field of Classification Search
CPC ... B29C 55/005; B29C 55/26; B29K 2023/08; B29K 2023/12; B29K 2023/16; F16L 9/12
See application file for complete search history.

(56) References Cited

U.S. PATENT DOCUMENTS

| | | | |
|---|---|---|---|
| 4,399,054 | A | 8/1983 | Ferraris et al. |
| 4,472,524 | A | 9/1984 | Albizzati |
| 5,910,346 | A | 6/1999 | Ward et al. |
| 6,325,959 | B1 | 12/2001 | Ek et al. |
| 2002/0107351 | A1 | 8/2002 | Tsuji et al. |
| 2022/0349499 | A1 | 11/2022 | Taraiya et al. |
| 2022/0396693 | A1 | 12/2022 | Taraiya et al. |

FOREIGN PATENT DOCUMENTS

| | | |
|---|---|---|
| EP | 0716119 A1 | 11/1995 |
| EP | 1183307 A1 | 3/2002 |
| EP | 1788023 A1 | 5/2007 |
| EP | 2145923 A1 | 1/2010 |
| EP | 2368922 A1 | 9/2011 |
| EP | 2368938 A1 | 9/2011 |
| WO | 2006010414 A1 | 2/2006 |
| WO | 2014044680 A1 | 3/2014 |
| WO | 2017148969 A1 | 9/2017 |
| WO | 2018138056 A1 | 8/2018 |
| WO | 2019030123 A1 | 2/2019 |

OTHER PUBLICATIONS

International Search Report; International Application No. PCT/EP2020/077666; International Filing Date: Oct. 2, 2020; Date of Mailing: Apr. 11, 2020; 5 pages.
Morath et al.; "The development of continuous large-scale die drawing for the production of oriented polymer rods and tubes"; Plastics, Rubber and Composites Processing and Applications, vol. 19; 1993; pp. 55-62.
Written Opinion; International Application No. PCT/EP2020/077666; International Filing Date: Oct. 2, 2020; Date of Mailing: Apr. 11, 2020; 7 pages.
Morath et al., "Biaxially Oreinted Polypropylene pipes: Implications for Impact and Hydrostatic pressure resistance," 2006, Plastics, Rubbers and Composites, vol. 35 No. 10. pp 447-454.
Ser Van Der Ven; "Polypropylene and other Polyolefins"; Elsevier; 1990; pp. 8-10.
International Search Report; International Application No. PCT/EP2020/07766; International Filing Date: Oct. 2, 2020; Date of Mailing: Apr. 11, 2020; 5 pages.
Written Opinion; International Application No. PCT/EP2020/07766; International Filing Date: Oct. 2, 2020; Date of Mailing: Apr. 11, 2020; 7 pages.

*Primary Examiner* — Yan Lan
(74) *Attorney, Agent, or Firm* — CANTOR COLBURN LLP

(57) ABSTRACT

The invention relates to a biaxially oriented pipe made of a polymer composition comprising a propylene-based polymer, wherein the propylene-based polymer comprises A) a heterophasic propylene copolymer, wherein the heterophasic propylene copolymer consists of (a1) a propylene-based matrix, wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and (a2) a dispersed ethylene-α-olefin copolymer, wherein the sum of the total amount of propylene-based matrix and total amount of the dispersed ethylene-α-olefin copolymer in the heterophasic propylene copolymer is 100 wt %, wherein the amount of (a2) with respect to the propylene-based polymer is 2.0 to 30.0 wt %.

15 Claims, No Drawings

BIAXIALLY ORIENTED PIPE

CROSS REFERENCE TO RELATED APPLICATIONS

This application is a National Stage application of PCT/EP2020/077666, filed Oct. 2, 2020, which claims the benefit of European Application No. 19201567.5, filed Oct. 4, 2019, both of which are incorporated by reference in their entirety herein.

The present invention relates to a pipe made by a biaxial elongation of a polypropylene composition.

It is known to improve the physical and mechanical properties of a polymer material by orienting the material. In many cases, orienting a material to improve a property in one direction leads to worsening of the same property in the direction perpendicular to the direction of orientation. In order to adapt the properties in both directions, a biaxial orientation of the material may be applied. The biaxial orientation means that the polymer material is oriented in two directions, perpendicular to one another. A pipe can be oriented in the axial direction and peripheral direction (hoop direction) to improve properties such as long-term hydrostatic pressure performance and low temperature impact.

A pipe made by a biaxial elongation of a polypropylene composition is known. U.S. Pat. No. 5,910,346 describes a drawn tube made from a tube of isotropic polypropylene (ICI grade GSE 108). Morath et al., Biaxially oriented polypropylene pipes, Plastics, Rubber and Composites 2006 vol 35 no 10, p.447-454 describes a biaxially oriented polypropylene pipe made from a random polypropylene copolymer with melt flow rate of 0.3 dg/min and an ethylene content of 4%.

One of the most important properties for pipes is the resistance to crack propagation.

It is an objective of the present invention to provide a biaxially oriented polypropylene pipe with good long-term hydrostatic pressure performance.

Accordingly, the present invention provides a biaxially oriented pipe made of a polymer composition comprising a propylene-based polymer, wherein the propylene-based polymer comprises A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt %.

A biaxially oriented pipe made a polymer composition means a biaxially oriented pipe made by a process comprising the steps of:
a) forming a polymer composition into a tube, and
b) stretching the tube of step a) in the axial direction and in the peripheral direction to obtain the biaxially oriented pipe.

Preferably, the biaxially oriented pipe is made of a polymer composition comprising a propylene-based polymer, wherein the propylene-based polymer comprises A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt %;
and wherein the pipe is made by a process comprising the steps of:
a) forming a polymer composition into a tube, and
b) stretching the tube of step a) in the axial direction and in the peripheral direction to obtain the biaxially oriented pipe.

The terms "pipe" and "tube" are herein understood as a hollow elongated article, which may have a cross section of various shapes. The cross section may e.g. be circular, elliptical, square, rectangular or triangular. The term "diameter" is herein understood as the largest dimension of the cross section.

It was surprisingly found that the biaxially oriented pipe according to the invention has an excellent long-term hydrostatic pressure performance.

The propylene-based polymer in the polymer composition for making the biaxially oriented pipe according to the invention comprises a heterophasic propylene copolymer. It was found that an excellent long-term hydrostatic pressure performance is obtained by making a biaxially oriented from a polymer composition having a certain amount of a dispersed ethylene-α-olefin copolymer ('rubber' content). When the 'rubber' content in the composition is too low, the biaxial drawing step cannot be successfully performed. When the 'rubber' content in the composition is too high, it is difficult to obtain the tube to be biaxially drawn. Moreover, when the 'rubber' content in the composition is too high, fluctuations in the wall thickness of the obtained biaxially oriented pipe are observed.

The suitable rubber content in the propylene-based polymer can be achieved by using a heterophasic propylene copolymer having 2.0 to 30 wt % of the dispersed ethylene-α-olefin copolymer. Alternatively, if the amount of the dispersed ethylene-α-olefin copolymer in the heterophasic propylene copolymer is not 2.0 to 30 wt %, additional components such as a propylene homopolymer may be added to adjust the 'rubber' content in the composition.

The amount of (a2) with respect to the propylene-based polymer is 2.0 to 30 wt %, for example at least 3.0 wt %, at least 4.0 wt %, at least 5.0 wt %, at least 7.0 wt % or at least 9.0 wt %. Preferably, the amount of (a2) with respect to the propylene-based polymer is at most 25 wt %, more preferably at most 20 wt %, more preferably at most 15 wt %, more preferably at most 13 wt %, more preferably at most 10 wt %. Most preferably, the amount of (a2) with respect to the propylene-based polymer is 4.0 to 7.0 wt %. This results in a biaxially oriented pipe having an excellent long-term hydrostatic pressure performance and a uniform wall thickness.

Propylene-Based Polymer

A) Heterophasic Propylene Copolymer

Heterophasic propylene copolymers are generally prepared in one or more reactors, by polymerization of propylene in the presence of a catalyst and subsequent polymerization of an ethylene-α-olefin mixture. The resulting polymeric materials are heterophasic, but the specific morphology usually depends on the preparation method and monomer ratios used.

The heterophasic propylene copolymers employed in the present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, US4399054 and US4472524.

Preferably, the heterophasic propylene copolymer is made using Ziegler-Natta catalyst.

The heterophasic propylene copolymer may be prepared by a process comprising polymerizing propylene and optionally ethylene and/or α-olefin in the presence of a catalyst system to obtain the propylene-based matrix and subsequently polymerizing ethylene and α-olefin in the propylene-based matrix in the presence of a catalyst system to obtain the dispersed ethylene-α olefin copolymer. These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based matrix consists of a propylene homopolymer and/or a propylene copolymer consisting of at least 70 wt % of propylene monomer units and at most 30 wt % of comonomer units selected from ethylene monomer units and α-olefin monomer units having 4 to 10 carbon atoms, for example consisting of at least 80 wt % of propylene monomer units and at most 20 wt % of the comonomer units, at least 90 wt % of propylene monomer units and at most 10 wt % of the comonomer units or at least 95 wt % of propylene monomer units and at most 5 wt % of the comonomer units, based on the total weight of the propylene-based matrix.

Preferably, the comonomer in the propylene copolymer of the propylene-based matrix is selected from the group of ethylene, 1-butene, 1-pentene, 4-methyl-1-pentene, 1-hexen, 1-heptene and 1-octene, and is preferably ethylene.

Preferably, the propylene-based matrix consists of a propylene homopolymer. The fact that the propylene-based matrix consists of a propylene homopolymer is advantageous in that a higher stiffness is obtained compared to the case where the propylene-based matrix is a propylene-α-olefin copolymer.

The melt flow index (MFI) of the propylene-based matrix (before the heterophasic propylene copolymer is mixed into the composition of the invention), MFIpp, may be for example at least 0.1 dg/min, at least 0.2 dg/min, at least 0.3 dg/min, at least 0.5 dg/min, and/or for example at most 20 dg/min, at most 10 dg/min, at most 5.0 dg/min, at most 3.0 dg/min, at most 1.0 dg/min, measured according to ISO1133 (2.16 kg/230° C.).

Preferably, the propylene-based matrix is present in an amount of 60 to 98 wt %, for example at most 97 wt %, at most 96 wt %, at most 95 wt %, at most 93 wt % or at most 91 wt %, based on the total heterophasic propylene copolymer. Preferably, the propylene-based matrix is present in an amount of at least 70 wt %, more preferably at least 75 wt %, more preferably at least 80 wt %, more preferably at least 85 wt %, more preferably at least 87 wt %, more preferably at least 90 wt %, based on the total heterophasic propylene copolymer. Most preferably, the propylene-based matrix is present in an amount of 93 to 96 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM). The amount of the dispersed ethylene-α-olefin copolymer in the heterophasic propylene copolymer may herein be sometimes referred as RC.

Preferably, the amount of ethylene monomer units in the ethylene-α-olefin copolymer is 34 to 60 wt %, preferably 40 to 60 wt %, 45 to 60 wt % or 50 to 60 wt %. The amount of ethylene monomer units in the dispersed ethylene-α-olefin copolymer in the heterophasic propylene copolymer may herein be sometimes referred as RCC2.

Preferably, the biaxially oriented pipe is made of a polymer composition comprising a propylene-based polymer, wherein the propylene-based polymer comprises A) a heterophasic propylene copolymer, wherein the heterophasic propylene copolymer consists of (a1) a propylene-based matrix, wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and (a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt %; and wherein
the amount of ethylene monomer units in the ethylene-α-olefin copolymer of (a2) is 34 to 60 wt %, preferably 40 to 60 wt %, 45 to 60 wt % or 50 to 60 wt %.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

Preferably, the biaxially oriented pipe is made of a polymer composition comprising a propylene-based polymer, wherein the propylene-based polymer comprises
A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt %; and wherein
the amount of ethylene monomer units in the ethylene-α-olefin copolymer of (a2) is 34 to 60 wt %, preferably 40 to 60 wt %, 45 to 60 wt % or 50 to 60 wt % and wherein the α-olefin in the ethylene-α-olefin copolymer of (a2) is preferably chosen from the group of α-olefins having 3 to 8 carbon atoms.

The MFI of the dispersed ethylene α-olefin copolymer (before the heterophasic propylene copolymer is mixed into the composition of the invention), MFIrubber, may be for example at least 0.001 dg/min, at least 0.03 dg/min or at least 0.05 dg/min, and/or for example at most 0.1 dg/min or 0.01 dg/min. MFIrubber is calculated according to the following formula:

$$MFI_{rubber} = 10 \wedge \left( \frac{Log\ MFIheterophasic - matrix\ content * Log\ MFImatrix}{rubber\ content} \right)$$

wherein
MFI heterophasic is the MFI (dg/min) of the heterophasic propylene copolymer measured according to ISO1133 (2.16 kg/230° C.),
MFImatrix is the MFI (dg/min) of the propylene-based matrix measured according to ISO1133 (2.16 kg/230° C.),
matrix content is the fraction of the propylene-based matrix in the heterophasic propylene copolymer,
rubber content is the fraction of the dispersed ethylene-α-olefin copolymer in the heterophasic propylene copolymer. The sum of the matrix content and the rubber content is 1. For the avoidance of any doubt, Log in the formula means $\log_{10}$.

Preferably, the dispersed ethylene-α-olefin copolymer is present in an amount of 2.0 to 40 wt %, for example at least 3.0 wt %, at least 4.0 wt %, at least 5.0 wt %, at least 7.0 wt % or at least 9.0 wt %. Preferably, the dispersed ethylene-α-olefin copolymer is present in an amount of at most 30 wt %, more preferably at most 25 wt %, more preferably at most 20 wt %, more preferably at most 15 wt %, more preferably at most 13 wt %, more preferably at most 10 wt %, based on the total heterophasic propylene copolymer. When the amount of the dispersed ethylene-α-olefin copolymer based on the total heterophasic propylene copolymer is at most 30 wt %, the composition may consist of the heterophasic propylene copolymer. Most preferably, the dispersed ethylene-α-olefin copolymer is present in an amount of 4.0 to 7.0 wt % based on the total heterophasic propylene copolymer.

Preferably, the biaxially oriented pipe is made of a polymer composition comprising a propylene-based polymer, wherein the propylene-based polymer comprises
A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt %;
and wherein (a2) is present in an amount of 2.0 to 40 wt %, for example at least 3.0 wt %, at least 4.0 wt %, at least 5.0 wt %, at least 7.0 wt % or at least 9.0 wt % or at most 30 wt %, more preferably at most 25 wt %, more preferably at most 20 wt %, more preferably at most 15 wt %, more preferably at most 13 wt %, more preferably at most 10 wt %, based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt % of the heterophasic propylene copolymer.

Preferably, the heterophasic propylene copolymer has a fraction soluble in p-xylene at 25° C. (CXS) measured according to ISO 16152:2005 of 20 to 5 wt %, for example 18 to 70%.

Preferably, the amount of ethylene monomer units in the heterophasic propylene copolymer (sometimes referred as TC2) is in the range of 1.0 to 16 wt %, for example 2.0 to 14 wt %, 3.0 to 12 wt % or 4.0 to 10 wt %, based on the heterophasic propylene copolymer.

Preferably, the MFI of the heterophasic propylene copolymer is 0.1 to 10.0 g/10 min, more preferably 0.1 to 4.0 g/10 min, particularly preferably 0.1 to 1.0 g/10 min, measured according to ISO1133-1:2011 (230° C./2.16 kg).

Preferably, in the heterophasic propylene copolymer according to the invention, the comonomer in the propylene-α-olefin copolymer is selected from ethylene and the group of α-olefins having 4 to 10 carbon atoms and the α-olefin in the ethylene-α-olefin copolymer is selected from the group of α-olefins having 3 to 8 carbon atoms.

Most preferably, in the heterophasic propylene copolymer according to the invention, the comonomer in the propylene-α-olefin copolymer is ethylene and the α-olefin in the ethylene-α-olefin copolymer is propylene.

Preferably, the amount of A) with respect to the propylene-based polymer is 30 to 100 wt %, for example at least 40 wt %, at least 50 wt %, more than 50 wt %, at least 55 wt %, at least 60 wt %, at least 70 wt %, at least 80 wt %, at least 90 wt %, at least 95 wt %, at least 98 wt %, at least 99 wt % or 100 wt %.

In preferred embodiments, the propylene-based polymer consists of A) wherein the amount of (b) with respect to A) is 2.0 to 30 wt %. This has an advantage that the pipe can be made by a simple process using a single type of a propylene-based polymer.

Preferably, the biaxially oriented pipe is made of a polymer composition comprising a propylene-based polymer, wherein the propylene-based polymer comprises A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt % and wherein the amount of A) with respect to the propylene-based polymer is 30 to 100 wt %, for example at least 40 wt %, at least 50 wt %, more than 50 wt %, at least 55 wt %, at least 60 wt %, at least 70 wt %, at least 80 wt %, at least 90 wt %, at least 95 wt %, at least 98 wt %, at least 99 wt % or 100 wt %.

Preferably, the biaxially oriented pipe is made of a polymer composition comprising a propylene-based polymer, wherein the propylene-based polymer comprises A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt % and wherein the amount of A) with respect to the propylene-based polymer is 30 to 100 wt %, preferably 90 to 100 wt % and wherein
(a2) is present in an amount of 2.0 to 40 wt %, preferably 4.0-15 wt % based on the total heterophasic propylene copolymer.

B) Propylene Homopolymer

The propylene-based polymer may further comprise B) a propylene homopolymer. This can be used to adjust the rubber content in the propylene-based polymer to ensure an excellent long-term hydrostatic pressure performance. When the amount of (a2) with respect to A) is more than 30 wt %, the propylene-based polymer comprises B) such that the amount of (a2) with respect to the propylene-based polymer is at most 30 wt %. The use of B) is advantageous in that pipes with different properties can be made from a single grade of heterophasic propylene copolymer by using different amounts of a homopolymer.

Preferably, the amount of B) with respect to the propylene-based polymer is 0 to 70 wt %, for example at least 5 wt %, at least 10 wt %, at least 15 wt %, at least 20 wt % or at least 25 wt % and/or at most 65 wt %, at most 60 wt %, at most 55 wt %, at most 50 wt %, at most 45 wt % or at most 40 wt %. For example, the amount of B) with respect to the propylene-based polymer may 5 to 30 wt % or 30 to 70 wt %.

Preferably, the propylene homopolymer has a melt flow index of 0.1 to 10.0 g/10 min, more preferably 0.1 to 4.0 g/10 min, more preferably 0.1 to 1.0 g/10 min, measured according to ISO1133-1:2011 (230° C./2.16 kg).

Preferably, the total amount of A) and B) is at least 80 wt %, at least 90 wt %, at least 95 wt %, at least 98 wt %, at least 99 wt % or 100 wt %.

C) Random Propylene Copolymer

The propylene-based polymer may further comprise C) a random copolymer of propylene and a comonomer which is ethylene and/or an α-olefin having 4 to 10 carbon atoms. Such component may e.g. be used to adjust the pipe properties when the amount of (a2) with respect to the propylene-based polymer is relatively small.

Typically, the amount of C) with respect to the propylene-based polymer is not large, for example at most 20 wt %, for example 1 to 10 wt %. In some embodiments, the propylene-based polymer does not comprise C) a random copolymer of propylene and a comonomer which is ethylene and/or an α-olefin having 4 to 10 carbon atoms.

In some embodiments, the random copolymer has a comonomer content of less than 3.8 wt % based on the random copolymer. When the comonomer content of the random copolymer is less than 3.8 wt %, the comonomer content is preferably at least 0.1 wt %, preferably 0.5 to 3.5 wt %, 0.5 to 3.0 wt % or 1.0 to 2.0 wt % based on said random polymer.

In some embodiments, the random copolymer has a comonomer content of at least 3.8 wt % based on the random copolymer. When the comonomer content of the random copolymer is at least 3.8 wt %, the comonomer content may be 3.8 to 10.0 wt %, for example 4.0 to 8.0 wt % or 4.2 to 6.0 wt % based on said random copolymer.

The term "comonomer content" is herein understood as the amount of comonomer-derived units. The total of the comonomer content and the amount of propylene-derived units in a random propylene copolymer is 100%.

Preferably, the comonomer is ethylene, 1-butene, 1-hexene and/or 1-octene. Most preferably, the comonomer is ethylene.

Preferably, the random propylene copolymer has a melt flow index of 0.1 to 10.0 g/10 min, more preferably 0.1 to 4.0 g/10 min, more preferably 0.1 to 1.0 g/10 min, measured according to ISO1133-1:2011 (230° C./2.16 kg).

Typically, the total amount of A), B) and C) is at least 95 wt %, at least 98 wt %, at least 99 wt % or 100 wt % based on the propylene-based polymer.

PREFERRED EMBODIMENTS

In some preferred embodiments, the propylene-based polymer consists of A), wherein the amount of (b) with respect to the propylene-based polymer is 2.0 to 30 wt %, preferably 4.0 to 15 wt %.

In some preferred embodiments, the propylene-based polymer consists of A) and B), wherein the amount of (b) with respect to the propylene-based polymer is 4.0 to 15 wt % and the amount of (b) with respect to A) is more than 30 wt %.

In some preferred embodiments, the propylene-based polymer consists of A) and B), wherein the amount of (b) with respect to the propylene-based polymer is 4.0 to 15 wt % and the amount of (b) with respect to A) is at most 30 wt %.

In some preferred embodiments, the propylene-based polymer consists of A) and B), wherein the amount of (b) with respect to A) is 4.0 to 15 wt %, wherein the amount of A) with respect to the propylene-based polymer is 75 to 90 wt % and the amount of B) with respect to the propylene-based polymer is 10 to 25 wt %.

In some preferred embodiments, the propylene-based polymer consists of A) and B), wherein the amount of (b) with respect to A) is 4.0 to 15 wt %, wherein the amount of A) with respect to the propylene-based polymer is 50 to 75 wt % and the amount of B) with respect to the propylene-based polymer is 25 to 50 wt %.

Preferably, the polymer composition comprising the propylene-based polymer essentially comprises no further polymers other than said propylene-based polymer.

The amount of the propylene-based polymer with respect to the total amount of polymers in the polymer composition may be at least 95 wt %, at least 98 wt %, at least 99 wt % or 100 wt %.

Preferably, the biaxially oriented pipe is made of a polymer composition comprising a propylene-based polymer, wherein the propylene-based polymer comprises A) a heterophasic propylene copolymer, wherein the heterophasic propylene copolymer consists of (a1) a propylene-based matrix, wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and (a2) a dispersed ethylene-α-olefin copolymer, wherein the sum of the total amount of propylene-based matrix and total amount of the dispersed ethylene-α-olefin copolymer in the heterophasic propylene copolymer is 100 wt %, wherein the amount of (a2) with respect to the propylene-based polymer is 2.0 to 30 wt % and wherein the amount of the propylene-based polymer with respect to the total amount of polymers in the polymer composition may be at least 95 wt %, at least 98 wt %, at least 99 wt % or 100 wt %.

Preferably, the biaxially oriented pipe is made of a polymer composition comprising a propylene-based polymer, wherein the propylene-based polymer comprises A) a heterophasic propylene copolymer, wherein the heterophasic propylene copolymer consists of (a1) a propylene-based matrix, wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and (a2) a dispersed ethylene-α-olefin copolymer, wherein the sum of the total amount of propylene-based matrix and total amount of the dispersed ethylene-α-olefin copolymer in the heterophasic propylene copolymer is 100 wt %, wherein the amount of (a2) with respect to the propylene-based polymer is 2.0 to 30 wt % and wherein the amount of A) with respect to the propylene-based polymer is 30 to 100 wt %, preferably 90 to 100 wt % and wherein the amount of the propylene-based polymer with respect to the total amount of polymers in the polymer composition may be at least 95 wt %, at least 98 wt %, at least 99 wt % or 100 wt %.

Preferably, the biaxially oriented pipe is made of a polymer composition comprising a propylene-based polymer, wherein the propylene-based polymer comprises A) a heterophasic propylene copolymer, wherein the heterophasic propylene copolymer consists of (a1) a propylene-based matrix, wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and (a2) a dispersed ethylene-α-olefin copolymer, wherein the sum of the total amount of propylene-based matrix and total amount of the dispersed ethylene-α-olefin copolymer in the heterophasic propylene copolymer is 100 wt %, wherein the amount of (a2) with respect to the propylene-based polymer is 2.0 to 30 wt % and wherein the amount of A) with respect to the propylene-based polymer is 30 to 100 wt %, preferably 90 to 100 wt % and wherein (a2) is present in an amount of 2.0 to 40 wt %, preferably 4.0-15 wt % based on the total heterophasic propylene copolymer.

Preferably, the biaxially oriented pipe made of a polymer composition comprising a propylene-based polymer, wherein the propylene-based polymer comprises A) a heterophasic propylene copolymer, wherein the heterophasic propylene copolymer consists of (a1) a propylene-based matrix, wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and (a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt % and wherein
the amount of A) with respect to the propylene-based polymer is 30 to 100 wt %, preferably 90 to 100 wt % and wherein
(a2) is present in an amount of 2.0 to 40 wt %, preferably 4.0-15 wt % based on the total heterophasic propylene copolymer and wherein
the amount of the propylene-based polymer with respect to the total amount of polymers in the polymer composition may be at least 95 wt %, at least 98 wt %, at least 99 wt % or 100 wt %.

The polymer composition may comprise components other than the propylene-based polymer, such as additives and fillers.

Examples of the additives include nucleating agents; stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; and/or components that enhance interfacial bonding between polymer and filler, such as a maleated polyethylene. The amount of the additives is typically 0 to 5 wt %, for example 1 to 3 wt %, with respect to the total composition.

Examples of fillers include glass fibers, talc, mica, nanoclay. The amount of fillers is typically 0 to 40 wt %, for example 5 to 30 wt % or 10 to 25 wt %, with respect to the total composition.

Accordingly, in some embodiments, the polymer composition further comprises 0 to 5 wt % of additives and 0 to 40 wt % of fillers.

The polymer composition may be obtained by melt-mixing the polyolefin with any other optional components.

Preferably, the total amount of the propylene-based polymer and the optional additives and the optional fillers is 100 wt % with respect to the total composition.

Process Steps

The biaxially oriented pipe is made by a process comprising the steps of:
a) forming a polymer composition into a tube, and
b) stretching the tube of step a) in the axial direction and in the peripheral direction to obtain the biaxially oriented pipe.

The process for making the pipe may be performed as a continuous process or a batch-wise process. A continuous process is herein understood as a process wherein the polymer composition is continuously fed for the tube making step a), while the drawing step b) is continuously performed.

The polymer composition may be formed into a tube (step a) by any known method, such as extrusion or injection moulding. The biaxial elongation (step b) may be performed by any known method.

Methods for forming the polymer composition into a tube and the biaxial elongation of the tube are described in U.S. Pat. No. 6,325,959:

A conventional plant for extrusion of plastic pipes comprises an extruder, a nozzle, a calibrating device, cooling equipment, a pulling device, and a device for cutting or for coiling-up the pipe. By the molten mass of polymer on its way from the extruder through the nozzle and up to calibration, cooling and finished pipe being subjected to shear and elongation etc. in the axial direction of the pipe, an essentially uniaxial orientation of the pipe in its axial direction will be obtained. A further reason that contributes to the orientation of the polymer material in the direction of material flow is that the pipe can be subjected to tension in connection with the manufacture.

To achieve biaxial orientation, this plant can be supplemented, downstream of the pulling device, with a device for temperature control of the pipe to a temperature that is suitable for biaxial orientation of the pipe, an orienting device, a calibrating device, a cooling device, and a pulling device which supplies the biaxially oriented pipe to a cutting device or coiler.

The biaxial orientation can also be carried out in direct connection with the first calibration after extrusion, in which case the above-described supplementary equipment succeeds the first calibrating device.

The biaxial orientation of the pipe can be carried out in various ways, for instance mechanically by means of an internal mandrel, or by an internal pressurised fluid, such as air or water or the like. A further method is the orienting of the pipe by means of rollers, for instance by arranging the pipe on a mandrel and rotating the mandrel and the pipe relative to one or more pressure rollers engaging the pipe, or via internally arranged pressure rollers that are rotated relative to the pipe against an externally arranged mould or calibrating device.

Further, Morath et al., Biaxially oriented polypropylene pipes, Plastics, Rubber and Composites 2006 vol 35 no 10, p.447-454 describes a process for making a biaxially oriented pipe from a random propylene copolymer.

Conditions for Step b)

The skilled person can select suitable conditions such as temperatures for step b) to obtain a biaxially oriented pipe. Step b) is performed at a drawing temperature which results in orientation of the propylene-based polymer in the polymer composition.

The drawing temperature is selected according to the melting point of the propylene-based polymer in the polymer composition.

The drawing temperature is herein defined as the temperature at the surface of the tube of step a) just prior to step b). Before step b), the mandrel and the tube of step a) are heated so that they have the desired drawing temperature. This may be done by soaking the mandrel and the tube of step a) at the drawing temperature for a period sufficient to attain thermal equilibrium, e.g. 30 minutes (the temperature is preferably controlled within ±1° C.).

The melting point is determined by differential scanning calorimetry according to ASTM D3418. The DSC measurements are performed using a DSC TA Q20 and an Intracooler capable of reaching −90° C. The measurements are done under nitrogen flow to avoid degradation. The methodology followed is:

First Heating: −40° C. to 230° C. @ 10° C./min (3 min hold at the end temperature)
Cooling: 230° C. to −40° C. @ 10° C./min
Second Heating: −40° C. to 230° C. @ 10° C./min
Sample used are between 3 and 5 mg
Melting point is reported from the second heating cycle.

The drawing temperature may be selected to be lower than the melting point of the propylene-based polymer in the polymer composition.

The drawing temperature may be 1 to 30 QC, for example 2 to 20 QC or 3 to 10 QC, lower than the melting point of the propylene-based polymer in the polymer composition.

When the propylene-based polymer comprises different propylene-based polymers having different melting points, the drawing temperature may be determined such that orientation of majority of the propylene-based polymers is achieved. The skilled person can suitably determine the suitable drawing temperature depending on the types and the amounts of the propylene-based polymers present in the polymer composition.

Generally, it is possible to select the drawing temperature to be within a suitable temperature range based on the melting point of each of the propylene-based polymers present in the polymer composition.

In case the differences in the melting points of the propylene-based polymers present in the polymer composition are very large, the drawing temperature may be selected based on the propylene-based polymers which is present in a major amount. For example, the drawing temperature may be selected based on the melting point of the propylene-based polymers which is present at a highest amount in the polymer composition. In determining the drawing temperature, it is also possible to ignore a propylene-based polymers which is present in a small amount, e.g. less than 5 wt % of the polymer composition.

In some embodiments, step b) is performed at a drawing temperature of 140 to 160° C., preferably 145 to 155° C.

Draw Ratios

Typically, step b) is performed at an axial draw ratio of 1.1 to 5.0 and an average hoop draw ratio of 1.1 to 3.0.

Preferably, the biaxially oriented pipe is made of a polymer composition comprising a propylene-based polymer, wherein the propylene-based polymer comprises A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt %;
and wherein the pipe is made by a process comprising the steps of:
a) forming a polymer composition into a tube, and
b) stretching the tube of step a) in the axial direction and in the peripheral direction to obtain the biaxially oriented pipe,
wherein step b) is performed at an axial draw ratio of 1.1 to 5.0 and an average hoop draw ratio of 1.1 to 3.0.

More preferably, the biaxially oriented pipe is made of a polymer composition comprising a propylene-based polymer, wherein the propylene-based polymer comprises A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt %;
and wherein the pipe is made by a process comprising the steps of:
a) forming a polymer composition into a tube, and
b) stretching the tube of step a) in the axial direction and in the peripheral direction to obtain the biaxially oriented pipe,
wherein step b) is performed at an axial draw ratio of 1.1 to 5.0 and an average hoop draw ratio of 1.1 to 3 and at a drawing temperature of 140 to 160° C., preferably 145 to 155° C.

More preferably, the biaxially oriented pipe is made of a polymer composition comprising a propylene-based polymer, wherein the propylene-based polymer comprises A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30 wt %; and wherein
the amount of the propylene-based polymer with respect to the total amount of polymers in the polymer composition may be at least 95 wt %, at least 98 wt %, at least 99 wt % or 100 wt %;
and wherein the pipe is made by a process comprising the steps of:
a) forming a polymer composition into a tube, and
b) stretching the tube of step a) in the axial direction and in the peripheral direction to obtain the biaxially oriented pipe,
wherein step b) is performed at an axial draw ratio of 1.1 to 5.0 and an average hoop draw ratio of 1.1 to 3 and at a drawing temperature of 140 to 160° C., preferably 145 to 155° C.

Preferably, the biaxially oriented pipe is made of a polymer composition comprising a propylene-based polymer, wherein the propylene-based polymer comprises A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %, wherein the amount of (a2) with respect to the propylene-based polymer is 2.0 to 30 wt % and wherein the amount of A) with respect to the propylene-based polymer is 30 to 100 wt %, preferably 90 to 100 wt % and wherein (a2) is present in an amount of 2.0 to 40 wt %, preferably 4.0-15 wt % based on the total heterophasic propylene copolymer and wherein the amount of the propylene-based polymer with respect to the total amount of polymers in the polymer composition may be at least 95 wt %, at least 98 wt %, at least 99 wt % or 100 wt % and wherein the pipe is made by a process comprising the steps of:
a) forming a polymer composition into a tube, and
b) stretching the tube of step a) in the axial direction and in the peripheral direction to obtain the biaxially oriented pipe, wherein step b) is performed at an axial draw ratio of 1.1 to 5.0 and an average hoop draw ratio of 1.1 to 3.0.

Preferably, the average hoop draw ratio of 1.1 to 2.0.

Preferably, the axial draw ratio of 1.1 to 4.0, for example 1.1 to 3.6 or 1.1 to 3.2. The axial draw ratio is typically larger for obtaining a biaxially oriented pipe with a higher outer diameter.

The axial draw ratio of the drawn pipe is defined as the ratio of the cross-sectional area of the starting isotropic tube to that of the biaxially oriented pipe (i.e. product), that is, $$\lambda_{axial} = \frac{(\text{Tube } OD)^2 - (\text{Tube } ID)^2}{(\text{Product } OD)^2 - (\text{Product } ID)^2}$$

OD stands for outer diameter and ID stands for inner diameter.

In the case of expanded tube drawing, the hoop draw ratio of the product varies from the inner to the outer wall. These draw ratios are defined as:

$$\lambda_{hoop,inner} = \frac{\text{Product } ID}{\text{Tube } ID}$$

$$\lambda_{hoop,outer} = \frac{\text{Product } OD}{\text{Tube } OD}$$

The average hoop draw ratio can be defined as:

$$\lambda_{average\ hoop} = \frac{\text{Total Draw Ratio } \lambda_{Total}}{\text{Axial Draw Ratio } \lambda_{axial}}$$

Where $$\lambda_{Total} = \frac{\text{Tube Wall Thickness}}{\text{Product Wall Thickness}}$$

Biaxially Oriented Pipe

The biaxially oriented pipe according to the present invention may be a pressure pipe or a non-pressure pipe. The preferred pipe is a pressure pipe.

The biaxially oriented pipe may typically have a wall thickness of 0.3 mm to 10 cm. The biaxially oriented pipe may typically have an outer diameter of 10 mm to 2000 mm. In some examples, the biaxially oriented pipe has an outer diameter of 10 mm to 10 cm and a thickness of 0.3 mm to 3 mm or 1 mm to 3 mm. In some examples, the biaxially oriented pipe has an outer diameter of 10 cm to 50 cm and a thickness of 1 mm to 1 cm. In some examples, the biaxially oriented pipe has an outer diameter of 50 cm to 2 m and a thickness of 5 mm to 10 cm.

Preferably, the biaxially oriented pipe according to the present invention has a time to failure of at least 100 hours, preferably at least 400 hours, more preferably at least 1000 hours, according to ISO 1167-1 determined at a stress level of 20 MPa and a temperature of 20° C.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Materials:

rPP1: propylene-ethylene copolymer with comonomer content of 4 wt % and MFR 230° C./2.16 kg of 0.3 g/10 minutes. Tm=142.1° C.

IPC1: heterophasic propylene copolymer consisting of 84.5 wt % of propylene homopolymer (MFI 230° C./2.16 kg of 0.55 dg/min) and 15.5 wt % of ethylene-propylene copolymer, wherein the amount of ethylene derived units in the ethylene-propylene copolymer is 55 wt %, MFI 230° C./2.16 kg of 0.3 dg/min IPC2: heterophasic propylene copolymer consisting of 91.0 wt % of propylene homopolymer (MFI 230° C./2.16 kg of 0.43 dg/min) and 9.0 wt % of ethylene-propylene copolymer, wherein the amount of ethylene derived units in the ethylene-propylene copolymer is 58 wt %, MFI 230° C./2.16 kg of 0.3 dg/min hPP1: propylene homopolymer, MFI 230° C./2.16 kg of 0.30 dg/min Production of biaxially oriented pipe:

Heterophasic propylene copolymer was made into granules using a twin screw extruder. Processing temperature and screw profile were of standard polypropylene compounding. Standard additives for a propylene based pipe were added in making the granules.

These compounded granules were used to produce thick tubular profiles of approximate dimensions of an outer diameter of about 32 mm and an inner diameter of about 16 mm. These thick tubes were drawn over an expanding conical mandrel of exit diameter of 32 mm and semi angle 15 degree at temperature as shown in table 1. Tubes were drawn very uniformly in thickness and could be drawn to low axial draw ratios.

These thick tubes were drawn over an expanding conical mandrel of exit diameter of 61-65 mm and semi angle 15 degree at temperature shown in table 1 at a draw speed of 100 mm/min. Axial draw ratio was 3 and the average hoop draw ratio was 1.3.

The resistance to internal pressure of pipes was determined at 20 MPa stress level at 20° C. according to ISO 1167-1. The time to failure of the pipe is shown in Table 1.

TABLE 1

| | | PP | dispersed phase with respect to total (wt %) | ethylene content with respect to total (wt %) | time to failure (hrs) |
|---|---|---|---|---|---|
| CEx 1 | undrawn | rPP1 | — | 4.0 | instantly |
| CEx 2 | undrawn | IPC1 | 15.5 | 8.5 | instantly |
| CEx 3 | undrawn | IPC2 | 9 | 5.2 | instantly |
| CEx 4 | undrawn | 80 wt % IPC2 and 20 wt % hPP1 | 7.2 | 4.2 | instantly |
| CEx 5 | undrawn | 50 wt % IPC 2 and 50 wt % hPP1 | 4.5 | 2.6 | instantly |
| CEx 6 | biaxially drawn at 140° C. | rPP1 | — | 4.0 | ~1 |
| Ex 7 | biaxially drawn at 150° C. | IPC1 | 15.5 | 8.5 | 5 |
| Ex 8 | biaxially drawn at 150° C. | IPC2 | 9 | 5.2 | 164 |
| Ex 9 | biaxially drawn at 150° C. | 80 wt % IPC2 and 20 wt % hPP1 | 7.2 | 4.2 | 2000 |
| Ex 10 | biaxially drawn at 150° C. | 50 wt % IPC 2 and 50 wt % hPP1 | 4.5 | 2.6 | >2000 |

For Ex 7, some fluctuations were observed in the wall thickness of the obtained biaxially oriented pipe. For Ex8, Ex 9 and Ex 10, no fluctuations were observed in the wall thickness of the obtained biaxially oriented pipe.

It can be understood that the biaxially oriented pipe made from a composition comprising a heterophasic propylene copolymer has a much longer time to failure than a biaxially oriented pipe made from a random propylene-ethylene copolymer or undrawn pipes.

It can further be understood that the lower amount of the dispersed phase in the heterophasic propylene copolymer leads to a longer time to failure. The amount of the dispersed phase in the heterophasic propylene copolymer with respect to the total composition can be adjusted by the addition of a homopolymer, which influences the time to failure (Ex 8, 9 and 10).

The invention claimed is:

1. A biaxially oriented pipe made of a polymer composition comprising a propylene-based polymer, wherein the propylene-based polymer comprises
A) a heterophasic propylene copolymer, wherein the heterophasic propylene copolymer consists of
(a1) a propylene-based matrix,
wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
(a2) a dispersed ethylene-α-olefin copolymer,
wherein the sum of the total amount of propylene-based matrix and total amount of the dispersed ethylene-α-olefin copolymer in the heterophasic propylene copolymer is 100 wt %,
wherein the amount of (a2) with respect to the propylene-based polymer is 2.0 to 30.0 wt %.

2. The pipe according to claim 1, wherein the amount of (a2) with respect to the propylene-based polymer is at least 3.0 wt %.

3. The pipe according to claim 1, wherein the amount of (a2) with respect to A) is 2.0 to 40 wt %.

4. The pipe according to claim 1, wherein the amount of ethylene monomer units in (a2) is 34 to 60 wt %.

5. The pipe according to claim 1, wherein (a1) is the propylene homopolymer and (a2) is ethylene-propylene copolymer.

6. The pipe according to claim 1, wherein the propylene-based polymer has a Melt Flow Index of 0.1 to 10.0 g/10 min measured according to ISO1133-1:2011 (230° C./2.16 kg).

7. The pipe according to claim 1, wherein the amount of the propylene-based polymer with respect to the total amount of polymers in the polymer composition is at least 95 wt %.

8. The pipe according to claim 1, wherein the polymer composition further comprises 0 to 5 wt % of additives and 0 to 40 wt % of fillers.

9. The pipe according to claim 1, wherein the pipe is made by a process comprising the steps of:
a) forming a polymer composition into a tube, and
b) stretching the tube of step a) in the axial direction and in the peripheral direction to obtain the biaxially oriented pipe,
wherein step b) is performed at a drawing temperature of 140 to 160° C. and at an axial draw ratio of 1.1 to 5.0 and an average hoop draw ratio of 1.1 to 3.0.

10. The pipe according to claim 1, wherein the pipe has a time to failure of at least 100 hours according to ISO 1167-1 determined at a stress level of 20 MPa and a temperature of 20° C.

11. The pipe according to claim 1, wherein the amount of A) with respect to the propylene-based polymer is 30 to 100 wt %.

12. The pipe according to claim 1, wherein the propylene-based polymer consists of A), wherein the amount of (a2) with respect to A) is 2.0 to 30 wt %.

13. A biaxially oriented pipe made of a polymer composition comprising a propylene-based polymer, wherein the propylene-based polymer comprises
- A) a heterophasic propylene copolymer, wherein the heterophasic propylene copolymer consists of
  - (a1) a propylene-based matrix,
    wherein the propylene-based matrix consists of a propylene homopolymer and/or a propylene copolymer consisting of at least 70 wt % of propylene monomer units and at most 30 wt % of ethylene and/or α-olefin monomer units, based on the total weight of the propylene-based matrix and
  - (a2) a dispersed ethylene-α-olefin copolymer,
    wherein the sum of the total amount of propylene-based matrix and total amount of the dispersed ethylene-α-olefin copolymer in the heterophasic propylene copolymer is 100 wt %,
    wherein the amount of (a2) with respect to the propylene-based polymer is 2.0 to 30.0 wt %
- B) a propylene homopolymer and/or
- C) a random copolymer of propylene and a comonomer which is ethylene and/or an α-olefin having 4 to 10 carbon atoms.

14. The pipe according to claim 13, wherein the amount of B) with respect to the propylene-based polymer is 5.0 to 70 wt %.

15. The pipe according to claim 13, wherein the amount of C) with respect to the propylene-based polymer is 1.0 to 20 wt %.

* * * * *